(12) United States Patent
Fithian et al.

(10) Patent No.: US 8,125,314 B2
(45) Date of Patent: Feb. 28, 2012

(54) DISTINGUISHING BETWEEN USER PHYSICAL EXERTION BIOMETRIC FEEDBACK AND USER EMOTIONAL INTEREST IN A MEDIA STREAM

(75) Inventors: Rachel H. Fithian, Raleigh, NC (US); Hugh E. Hockett, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 1059 days.

(21) Appl. No.: 12/026,150

(22) Filed: Feb. 5, 2008

(65) Prior Publication Data

US 2011/0169603 A1 Jul. 14, 2011

(51) Int. Cl.
- *G06F 13/42* (2006.01)
- *G06F 7/00* (2006.01)
- *G06F 7/04* (2006.01)
- *G05B 19/00* (2006.01)
- *G05B 23/00* (2006.01)
- *G08B 29/00* (2006.01)
- *G08B 1/08* (2006.01)
- *G08B 23/00* (2006.01)
- *G08C 19/00* (2006.01)
- *H04B 1/00* (2006.01)
- *H04B 3/00* (2006.01)
- *H04Q 1/00* (2006.01)
- *H04Q 9/00* (2006.01)
- *G06K 19/00* (2006.01)

(52) U.S. Cl. ......... 340/5.52; 340/1.1; 340/5.1; 340/5.2; 340/5.51; 340/539.12; 340/573.1

(58) Field of Classification Search .................. 340/1.1, 340/5.1, 5.2, 5.51, 5.52, 539.12, 573.1
See application file for complete search history.

(56) References Cited

U.S. PATENT DOCUMENTS

| | | | | | |
|---|---|---|---|---|---|
| 4,312,358 | A | * | 1/1982 | Barney | 600/483 |
| 5,157,604 | A | * | 10/1992 | Axford et al. | 600/508 |
| 2004/0089140 | A1 | * | 5/2004 | Georges et al. | 84/609 |
| 2006/0278240 | A1 | * | 12/2006 | Spillman et al. | 128/898 |
| 2007/0028749 | A1 | * | 2/2007 | Basson et al. | 84/601 |
| 2007/0074619 | A1 | * | 4/2007 | Vergo | 84/612 |
| 2007/0113726 | A1 | * | 5/2007 | Oliver et al. | 84/615 |
| 2011/0169603 | A1 | * | 7/2011 | Fithian et al. | 340/5.52 |

* cited by examiner

*Primary Examiner* — Daniel Wu
*Assistant Examiner* — Kam Ma
(74) *Attorney, Agent, or Firm* — Patents On Demand P.A.; Brian K. Buchheit; Scott M. Garrett

(57) ABSTRACT

The present invention discloses a method, system, and computer program product for determining user interest in media. The invention can select one of a set of different activity profiles specified within a data store. Each activity profile can include biometric attributes and associated baseline attribute values specific to an activity state. A media stream can be manipulated (e.g., created from environmental inputs and/or played upon a presentation device). Biometric data can be received from a user in proximity to the media stream. The received biometric data can be compared values in the selected activity profile. An interest level in the media stream can be determined based on comparison differences. A programmatic action can be performed relating to the media stream based upon the determined interest level. For example, a bitrate of the media and/or a marker in the media can be modified based on interest level.

18 Claims, 3 Drawing Sheets

200

Activity Table 210

| Activity | Activity Profile | Activity Level |
|---|---|---|
| Walking 212 | 70 BPM; Movement (low) - arms, legs; Respiration (low); Velocity (low) 214 | Low 216 |
| Jogging | 90 BPM; Movement (average) - arms, legs; Respiration (average); Velocity (average) | Average |
| Weightlifting | 95 BPM; Movement (low) - arms, legs; Respiration (average); ; Velocity (none) | Moderate |
| Running | 120 BPM; Movement (high) - arms, legs; Respiration (moderate); Velocity (high) | High |
| Surfing | 110 BPM; Movement (low) - arms, legs; Respiration (low); Velocity (average) | Moderate |
| Swimming | 130 BPM; Movement (high) - arms, legs; Respiration (moderate); Velocity (low) | High |
| Driving | 70 BPM; Movement (very low) - arms, legs; Respiration (low); Velocity (very high) | Low |

Emotional Interest Assessment Table 220

| Activity Level | Baseline Heartrate | Emotional Interest Level | | |
|---|---|---|---|---|
| | | Low | Average | High |
| Low 222 | 60-80 BPM | +/- 3 BPM | +/- 5 BPM | +/- 7 BPM |
| Average | 80-100 BPM | +/- 3 BPM | +/- 5 BPM | +/- 7 BPM |
| Moderate | 100-120 BPM | +/- 3 BPM | +/- 5 BPM | +/- 7 BPM |
| High | 120-140 BPM | +/- 3 BPM | +/- 5 BPM | +/- 7 BPM |

Media Processing Table 230

| Emotional Interest | Video Fidelity | Sound | Image Quality |
|---|---|---|---|
| Low 232 | Low - 720x480i60 | Stereo | 640x480@16bit |
| Average | Normal - 1024x768i60 | 5.1 Encoding | 1024x768@16bit |
| High | High Def - 1920x1080p60 | 7.1 Encoding | 1280x1024@32bit |

FIG. 2

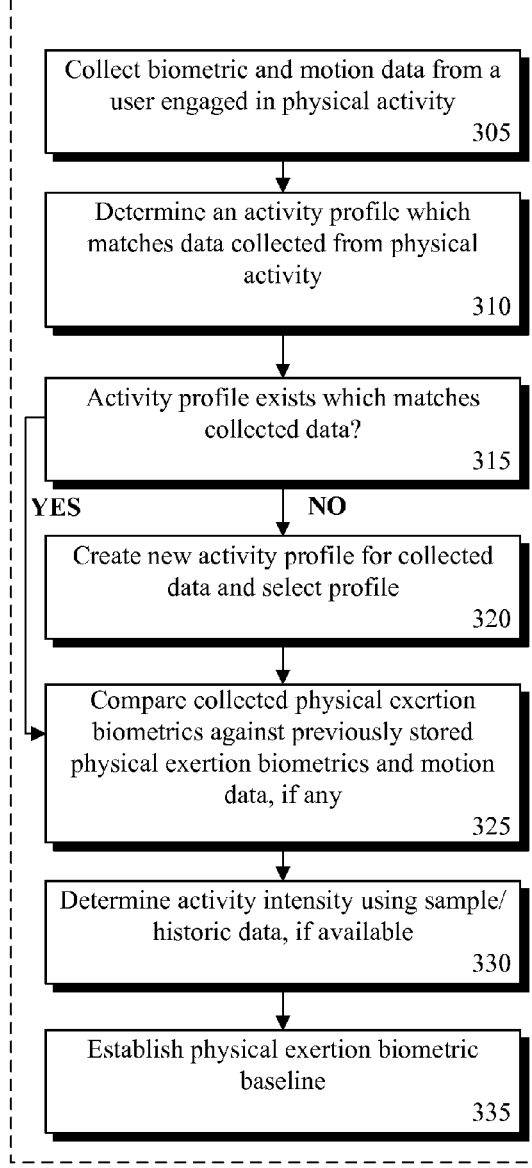
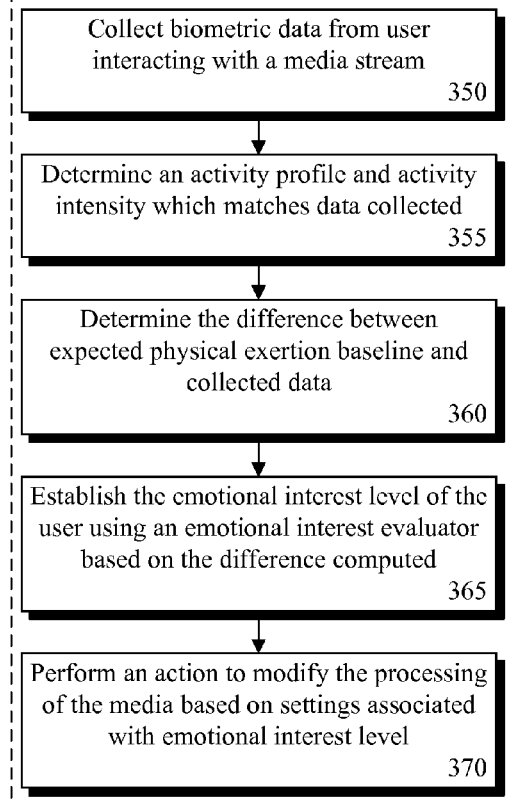
FIG. 3B
FIG. 3A

DISTINGUISHING BETWEEN USER PHYSICAL EXERTION BIOMETRIC FEEDBACK AND USER EMOTIONAL INTEREST IN A MEDIA STREAM

BACKGROUND OF THE INVENTION

The present invention relates to the field of multimedia processing and, more particularly, to distinguishing between user physical exertion biometric feedback and user emotional interest in a media stream.

As technology becomes more sophisticated, companies desire to create more "smart" multimedia devices which account for user's needs and wants. These "smart" devices, such as camcorders, cameras, and media players, can respond intelligently to various environmental and user based stimuli. Stimuli, from a user, such as physical movement, speech, and emotional interest are extremely useful to allowing these devices to react. While many of these stimuli are easily determined, user emotional interest can be difficult to assess.

One possible technique for determining user interest relies on collecting and monitoring biometric data such as user vital signs and physiological states. Despite its technical possibilities, conventional devices rarely attempt to determine emotional interest based upon biometric data, which may be a result of current techniques producing excessive false positives. False positives can result from physical exertions and other situational factors. For instance, when a user is engaged in physical activity, collected biometric data can produce misleading conclusions. For example, heart rate data collected from a person listening to music while jogging is expected to be greater than an at-rest heart rate. Since an elevated heart rate in absence to other factors (such as physical exertion) is indicative of emotional interest, false positives can easily occur due to the physical exertions, for which conventional implementations fail to account.

While other techniques exist for determining user interest, these techniques lack the benefits of automation and simplicity possible to achieve through a physical biometric based technique. For example, one alternative technique determines user interest based on historic behavior. This alternative technique can rely on repeated interaction with media, and may only provide results after an extended period of time. Another technique can depend on allowing a user to manually indicate interest in media. Manual techniques requiring user input can be time consuming and tedious for the user, yielding only marginally useful results. As such it is often neglected by users.

BRIEF SUMMARY OF THE INVENTION

One aspect of the present invention can include a method, system, and computer program product for determining user interest in media. The aspect can select one of a set of different activity profiles specified within a data store. Each activity profile can include at least one biometric attribute and an associated baseline attribute value specific to an activity state corresponding to the activity profile. A media stream can be manipulated (e.g., created from environmental inputs and/or played upon a presentation device). Biometric data can be received from a user in proximity to the media stream. The received biometric data can be compared against corresponding baseline attribute values specified within the selected activity profile. An interest level in the media stream can be determined based at least in part upon results of comparing the received biometric data with the corresponding baseline attribute values. At least one programmatic action can be performed relating to the media stream based upon the determined interest level.

Another aspect of the present invention can include a system for determining user emotional interest in a media stream that includes a biometric processor, an activity processor, an emotional interest evaluator, and a media processing component. The biometric processor can analyze captured biometric data from a user engaged in a physical activity during a media presentation event and/or during a media capture event. The activity processor can automatically identify a physical activity being performed by the user. The emotional interest evaluator can determine at least one difference in an expected biometric measurement and a captured biometric measurement. The media processing component can selectively modify a characteristic of a media based upon the determined difference. The modified media is the media associated with the media presentation event and/or the media capture event.

BRIEF DESCRIPTION OF THE SEVERAL VIEWS OF THE DRAWINGS

FIG. 2 is a schematic diagram illustrating a set of tables for determining user emotional interest in a media stream based on an activity profile in accordance with an embodiment of the inventive arrangements disclosed herein.

FIG. 3A is a schematic diagram illustrating a method for establishing a physical exertion biometric baseline for a user engaged in physical activity in accordance with an embodiment of the inventive arrangements disclosed herein.

FIG. 3B is a schematic diagram illustrating a method for assessing a user emotional interest in a media stream using a physical exertion biometric baseline in accordance with an embodiment of the inventive arrangements disclosed herein.

DETAILED DESCRIPTION OF THE INVENTION

Figure 1:
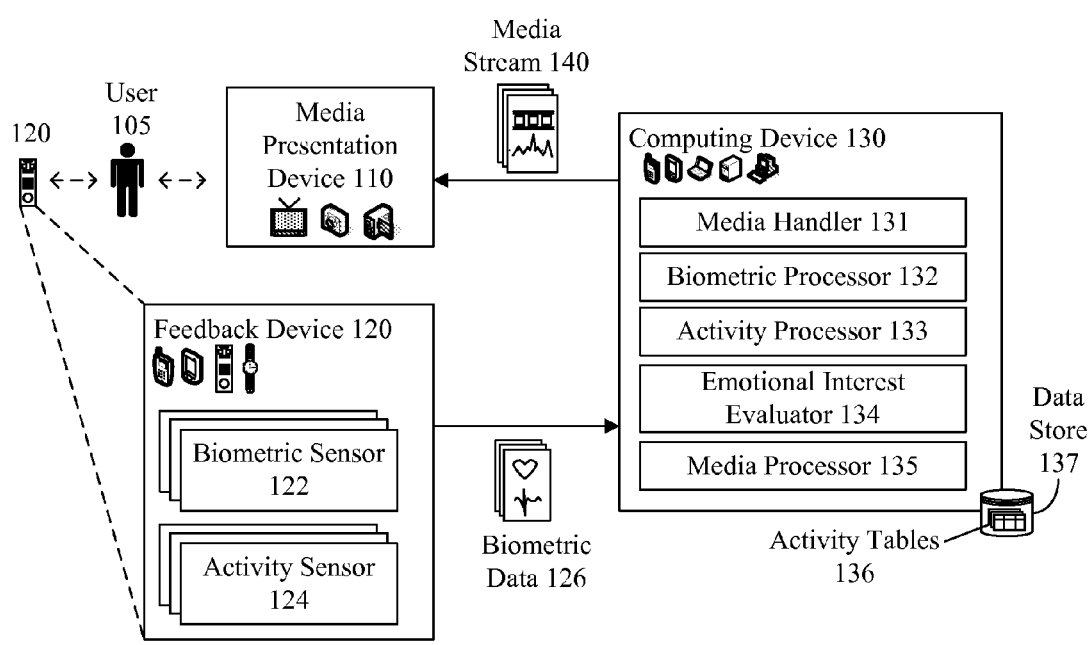
FIG. 1 is a schematic diagram illustrating a system for distinguishing physical exertion biometric feedback from user interest in a media stream in accordance with an embodiment of the inventive arrangements disclosed herein.

The present invention discloses a solution for distinguishing between biometric feedback resulting from physical exertions and/or other situational factors and user emotional interest in a media stream. In the solution, user emotional interest in a media stream can be accurately established, even when a user is engaged in physical exertion. In the invention, a set of activity profiles can be established, where each activity profile is associated with a set of expected biometric values for a given user for that activity. A feedback loop can be established, to adjust these activity profiles over time, as a user's relative fitness level and health (which affects the expected biometric values for a related activity) can change over time. It is assumed that a user is able to experience a media stream during the various profiled activities, such as being able to listen to music while jogging or able to watch a video while cycling on a stationary bike. A series of motion/activity sensors can be used to detect that a user is engaging in a particular activity, which permits an electronic/computing device to select a suitable profile automatically. Each activity profiles can be used to establish an expected physical exertion baseline for a given activity. Using this baseline, the difference in measured results and expected biometric values can be used to determine the user interest level in a media stream. Once emotional interest is suitably determined, a distinct programmatic action can be performed based upon the determined user interest level.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other progammable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a system 100 for distinguishing physical exertion from user interest in a media stream using biometric data in accordance with an embodiment of the inventive arrangements disclosed herein. In system 100, biometric data 126 collected from a user 105 interacting with a media stream 140 can be used to determine user 105 emotional interest in stream 140. Biometric data 126 can be collected from feedback device 120 and conveyed to computing device 130 for analysis. User 105 activity and emotional interest can be assessed by device 130 components 132-134 using activity tables 136. Based on the determined user 105 emotional interest, media stream 140 can be altered accordingly. Media stream 140 includes audio, video, images, and the like. Media processor 135 can perform an action to alter the stream 140 including, but not limited to, modifying the bitrate of a stream, adjusting and/or changing compression options, performing a navigation action, and the like.

For example, when user 105 is highly interested in media stream 140, media processor 135 can increase the audio/video quality of the stream. In another example, navigation tags can be inserted into the media stream 140 at points of heightened user 105 interest, so that the user 105 can easily navigate to these tags when experiencing the media stream 140 in the future. Interest tags inserted into a media can be used in more subtle ways as well, such as establishing a preference for those music files in a playlist of songs that are associated with heightened user 105 interest so that preferred songs are played more often during a "random" or "shuffled" playing of the playlist.

As used herein, biometric data 126 can include, but is not limited to, heart rate, respiratory rate, galvanic skin response (GSR), pupil dilation, blood pressure, body temperature, perspiration, velocity, acceleration, directional motion, and the like. Biometrics can be collected from sensors 122, 124 which can include, but is not limited to, electrodermal sensors, microphones, thermometers, accelerometers, gyroscopes, global positioning systems (GPS) components, and the like. Sensors 122, 124 can include wired and/or wireless sensors associated with device 120, media presentation device 140, or device 130.

Media handler 131 can convey media stream 140 to media presentation device 110. Media presentation device 110 (e.g. television, music system, computer monitor, etc.) can present media stream 140 to user 105. As user 105 is presented with stream 140, biometric feedback data 126 can be collected by device 120 from user 105. Device 120 can be a portable computing device, portable multimedia device, wrist watch, mobile phone, game controller, remote controller, and the like. Biometric feedback data 126 collected by sensors 122, 124 can be time-synched with the media stream 140. Synchronization of biometric data 126 with the timing of media stream 140 can be used to determine a point of interest in the media stream 140.

When the user 105 is in a "typical" leisure state (e.g., not engaged in physical exertion), biometric feedback 126 can be a reliable indicator of user interest in a playing media stream 140. As such, user interest in media stream 140 can be determined based on a simple analysis of biometric feedback 126. When user 105 is performing an activity that significantly alters a baseline state, however, their biometric feedback 126 must be adjusted to reflect this change to an expected baseline state due to the activity (e.g., physical exertion, extreme stress, anger, etc.). Computing device 130 can automatically perform adjustments for proper interpretation of the biometric feedback 126 as an indictor of user 105 interest.

For example, the computing device 130 can be used to differentiate physical exertion biometric data from emotional interest biometric data. In a sample instance, user 105 can be determined to be engaged in physical activity by data collected from activity sensor 124, which can detect user 105 movements, such as physical movements of the user's 105 body. This data can be collected during periods when no media stream is playing, which can be used to create a physical exertion biometric baseline for an activity. Biometric data collected from sensor 122 can be used to correlate biometric feedback to an activity. This data can be processed by processors 132, 133 and stored in data store 137 in activity tables 136. Activity processor 133 can utilize activity tables 136 which can contain profiles for various physical activities to determine what activity a user is performing. Profiles can include historic/sample biometric data, such as physical movements, that is expected when a user is engaged in a specific activity. Similarly, processor 133 can store biometric data, such as heart rate, for use in determining physical exertion for a given activity. Processors 132, 133 can be used to determine various intensity levels for a given activity based on variances in biometric feedback 126. For example, a "walking" profile can be used to identify biometric feedback to determine when the user is walking slowly or quickly.

After the activity specific baselines are established, processor 132, 133 can compare collected data 126 to profiles in activity tables 136 to determine a specific activity the user 105 is performing. When no profiles are found, a new profile can be created and collected data 126 can be stored for the new profile. Activity tables 136 profiles can be used to establish a physical exertion biometric feedback baseline which can be used in determining user emotional interest in media stream 140. Based on this baseline, emotional interest evaluator 134 can be used to assess user's interest in media 140. When a user is performing an activity that matches a stored profile, expected biometric feedback can be determined.

For example, a "jogging" profile can be used to determine an expected level of biometric feedback, such as heart rate, respiratory rate, perspiration, and the like. If collected biometric feedback does not match the expected biometric feedback contained in the profile, evaluator 134 can be used to differentiate physical exertion from emotional interest. Evaluator 134 can utilize tables 136 to establish the interest level of user 105 based on a scale of variance in the average physical exertion biometric baseline. For instance, if a user's respiratory rate is only slightly higher than expected, user emotional interest can be determined as being "low". Using timing data stored along with biometric data 126, evaluator 134 can determine points of interest in media stream 140. Once a level of user 105 interest and point of interest is established, media processor 135 can perform an action to modify the presentation of media stream 140 using handler 131. The action can be performed in real-time or near real-time based on media settings associated with a user interest level.

Figures presented herein are for illustrative purposes only, and should not be construed to limit the invention in any regard. Alternative embodiments can be contemplated including, but not limited to, configurations in which device 110-120 functionality can be performed by a single device, functionality distributed over one or more computing devices, functionality distributed over a network, and the like.

FIG. 2 is a schematic diagram illustrating a set of tables 210-230 for determining user emotional interest in a media stream based on an activity profile in accordance with an embodiment of the inventive arrangements disclosed herein. Tables 210-230 can be utilized in performing functions associated with emotional interest evaluator 134 in system 100. Tables 210-230 can be used to establish an activity profile, determine a physical exertion baseline, assess the emotional interest of a user, and perform at least one media processing action based on user interest. Tables 210-230 presented herein are for illustrative purposes only, and should not be construed to limit the invention in any regard.

Biometric data associated with user physical exertion can be stored in activity table 210. In table 210, an activity profile can be associated for various activities and exertion levels. For example, biometric data 214 for a "walking" profile 212 can include a physical exertion baseline heart rate of seventy beats per minute (BPM), a low respiratory rate, and a low velocity. When user physical activity is matched with the "walking" profile 212, the activity level can indicate a low physical exertion 216. Table 210 data can be continuously updated to adjust for changes in user health, new activities, variation in performance of activities, and the like.

Activity level 216 can be correlated to an emotional interest assessment table 220 which can be used to determine user interest level. An activity level can have an expected range of biometric feedback associated and a variance indicator for use in determining interest level as shown in section 222. Variance indicator can be an average value, such as plus or minus five BPM, for which an emotional interest level is associated. For example, in section 222, a user engaged in a low activity level (e.g. seventy BPM), measured having a heart rate of seventy-seven BPM, can be determined to have a high interest in a media stream. Multiple biometric sources (e.g. respiratory rate, blood pressure) can be utilized, each with their own emotional interest assessment table. An average of the results of all assessment tables can be used to provide an average of the level of emotional interest.

Based on the established emotional interest, a playing media stream can be dynamically adjusted depending on settings in media processing table 230. In table 230, a media configuration can be associated with each emotional interest level. An interest level can be associated with an audio, video, and/or image setting, as shown in section 232. Based on the media, each setting can be applied in real-time or near real-time in response to user interest change. For example, when user interest has been determined to be low, a media processor 135 can decreased the quality of a video stream (e.g. 720× 480i60), based on the video setting column of section 232. Settings present in table 230 can be manually or automatically adjusted based on the performance and/or capabilities of the media presentation device, user preferences, and the like.

FIG. 3A is a schematic diagram illustrating a method 301 for establishing a physical exertion biometric baseline for a user engaged in physical activity in accordance with an embodiment of the inventive arrangements disclosed herein. Method 301 can be performed in the context of system 100. In method 301, a physical exertion baseline for a user engaged in physical activity, can be established using an activity profile. The physical exertion baseline can include expected biometric feedback for a user engaged in a specific activity. The physical exertion baseline can be used in method 302 to establish user emotional interest in a media stream.

In step 305, collection of biometric and motion data from a user engaged in physical activity can occur. Collection can include one or more sources such as heart rate, respiratory rate, pupil dilation, galvanic skin response (GSR), velocity, acceleration, directional movement, and the like. These sources can be monitored by wired or wireless sensors capable of capturing biometric and/or motion data. In step 310, based on the physical activity biometric data, an activity profile can be determined and selected based on a comparison match.

In step 315, if no activity profile is found the method can continue to step 320, else proceed to step 330. In step 320, a new activity profile can be created and selected to store collected data. In step 325, the collected physical exertion biometrics is compared against previously stored physical exertion biometrics and motion data. If no historic data is found, this step can rely on generic sample biometric data which can be provided by manufacturers, software creators, and the like. In step 330, an activity profile can be used to determine activity intensity by comparing collected biometrics against historic and/or sample data. In step 335, a physical exertion baseline can be established for a user performing a specific activity at a particular intensity level.

FIG. 3B is a schematic diagram illustrating a method 302 for assessing a user emotional interest in a media stream using a physical exertion biometric baseline in accordance with an embodiment of the inventive arrangements disclosed herein. Method 302 can be performed in the context of system 100. In method 302, a physical exertion baseline can be used to separate physical exertion biometric data from user emotional interest data. This data can be used to establish the user emotional interest and perform an action based on the user interest level.

In step 350, biometric data is collected from a user interacting with a media stream. Media stream can include one or more audio/video streams, image, set of images, and the like. In step 355, an activity profile and intensity is determined which can be computed using method 301. In step 360, the difference in expected physical exertion baseline and collected data can be determined. In step 365, an emotional interest evaluator can be used to establish the interest level of the user. In step 370, an action can be performed based on settings associated with the emotional interest level determined in the preceding step. Actions can include, but are not limited to, modifying the bitrate of a stream, adjusting and/or changing compression options, performing a navigation action, and the like.

The flowchart and block diagrams in FIG. 3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for determining user interest in media comprising:
   determining an activity state of a user;
   identifying one of a plurality of different activity profiles specified within a data store based upon the determined activity state; wherein each activity profile comprises at least one biometric attribute and one or more associated baseline attribute values specific to an activity state corresponding to the activity profile, wherein said different activity profiles correspond to at least one of a level of physical exertion and a specific physical activity;
   capturing biometric data from the user when a media stream is not playing;
   determining the baseline attribute values for the identified activity profile based upon the captured biometric data;
   storing in the data store the at least one determined baseline attribute values in entries associated with the identified activity profile;
   selecting one of the plurality of different activity profiles specified within the data store;
   manipulating the media stream;
   receiving biometric data from the user, who is in proximity to the media stream;
   comparing the received biometric data against corresponding baseline attribute values specified within the selected activity profile;
   determining an interest level in the media stream based at least in part upon results of comparing the received biometric data with the corresponding baseline attribute values; and
   performing at least one programmatic action relating to the media stream based upon the determined interest level.

2. The method of claim 1, wherein the baseline attribute values stored within the different activity profiles are specific to the user.

3. The method of claim 1, further comprising:
   receiving activity specific data from at least one sensor, wherein the sensor comprises at least one of an accelerometer, a location detection sensor, a movement detection sensor, and a sensor for detecting data, wherein the detected data is used to determine a setting of exercise equipment being utilized by the user; and
   determining the selected activity profile based upon the received activity specific data.

4. The method of claim 1, wherein the received biometric data is time-synched with the manipulated media stream, said method further comprising:
   storing said media stream in any manner based upon the determined interest level.

5. The method of claim 1, wherein said media stream manipulation captures environmental input to create the media stream, wherein the biometric data is acquired at a time the captured environmental input is obtained and is time-synched with the captured environmental input, said method further comprising:
   storing said media stream in any manner based upon the determined interest level.

6. The method of claim 1, wherein said media stream manipulation presents output of media stream upon a media presentation device, wherein the biometric data is acquired at a time the output of the media stream is being presented and is time-synched with a presentation of the media stream, said method further comprising;
   storing said media stream in any manner based upon the determined interest level.

7. The method of claim 1, wherein said media stream comprises at least one of audio stream, a video stream, and a stream comprising a plurality of images, wherein the method further comprising:
   using the biometric data to determine an emotional interest level of a provider of the biometric data, wherein different ones of the portions of the media stream is associated with different determined emotional interest levels; and
   storing said media stream in any manner based upon the determined emotion interest levels.

8. A non-transitory computer usable storage medium comprising:
   said non-transitory computer usable storage medium having computer usable program code embodied therewith, the computer usable program code comprising:
   the computer usable program code configured to determine an activity state of a user;
   the computer usable program code configured to identify one of a plurality of different activity profiles based upon the determined activity state, wherein each activity profile comprises at least one biometric attribute and one or more associated baseline attribute values specific to an activity state corresponding to the activity profile;
   the computer usable program code configured to capture biometric data from the user when a media stream is not playing;
   the computer usable program code configured to determine the baseline attribute values for the identified activity profile based upon the captured biometric data;
   the computer usable program code configured to store in the data store the determined baseline attribute values in entries associated with the identified activity profile;
   the computer usable program code configured to select one of the plurality of different activity profiles specified within the data store;
   the computer usable program code configured to manipulate the media stream;
   the computer usable program code configured to receive biometric data from the user, who is in proximity to the media stream;
   the computer usable program code configured to compare the received biometric data against corresponding baseline attribute values specified within the selected activity profile;
   the computer usable program code configured to determine an interest level in the media stream based at least in part upon results of comparing the received biometric data with the corresponding baseline attribute values; and
   the computer usable program code configured to perform at least one programmatic action relating to the media stream based upon the determined interest level.

9. The non-transitory computer usable storage medium of claim 8, wherein said different activity profiles correspond to at least one of a level of physical exertion and a specific physical activity.

10. The non-transitory computer usable storage medium of claim 8, wherein the received biometric data is time-synched with the manipulated media stream, said the computer program product further comprising:

the computer usable program code configured to store said media stream in any manner based upon the determined interest level.

11. The non-transitory computer usable storage medium of claim 8, the computer program product further comprising:

the computer usable program code configured to receive activity specific data from at least one sensor, wherein the sensor comprises at least one of an accelerometer, a location detection sensor, a movement detection sensor, and a sensor for detecting data, wherein the detected data is used to determine a setting of exercise equipment being utilized by the user; and the computer usable program code configured to determine the selected activity profile based upon the received activity specific data.

12. A computer system comprising:

one or more processors, one or more computer-readable memories, and one or more computer readable tangible storage devices; and program instructions, stored on at least one of the one or more storage devices for execution by at least one of the one or more processors via at least one of the one or more memories, to:

determine an activity state of a user;

identify one of a plurality of different activity profiles specified within a data store based upon the determined activity state; wherein each activity profile comprises at least one biometric attribute and one or more associated baseline attribute values specific to an activity state corresponding to the activity profile, wherein said different activity profiles correspond to at least one of a level of physical exertion and a specific physical activity;

capture biometric data from the user when a media stream is not playing;

determine the baseline attribute values for the identified activity profile based upon the captured biometric data;

store in the data store the at least one determined baseline attribute values in entries associated with the identified activity profile;

select one of the plurality of different activity profiles specified within the data store;

manipulate the media stream;

receive biometric data from the user, who is in proximity to the media stream;

compare the received biometric data against corresponding baseline attribute values specified within the selected activity profile;

determine an interest level in the media stream based at least in part upon results of comparing the received biometric data with the corresponding baseline attribute values; and perform at least one programmatic action relating to the media stream based upon the determined interest level.

13. The computer system of claim 12, wherein the baseline attribute values stored within the different activity profiles are specific to the user.

14. The computer system of claim 12, wherein the program instructions, stored on at least one of the one or more storage devices for execution by at least one of the one or more processors via at least one of the one or more memories, are further operable to:

receive activity specific data from at least one sensor, wherein the sensor comprises at least one of an accelerometer, a location detection sensor, a movement detection sensor, and a sensor for detecting data, wherein the detected data is used to determine a setting of exercise equipment being utilized by the user; and determine the selected activity profile based upon the received activity specific data.

15. The computer system of claim 12, wherein the received biometric data is time-synched with the manipulated media stream, wherein said program instructions, stored on at least one of the one or more storage devices for execution by at least one of the one or more processors via at least one of the one or more memories, are further operable to:

store said media stream in any manner based upon the determined interest level.

16. The computer system of claim 12, wherein said media stream manipulation captures environmental input to create the media stream, wherein the biometric data is acquired at a time the captured environmental input is obtained and is time-synched with the captured environmental input, wherein the program instructions, stored on at least one of the one or more storage devices for execution by at least one of the one or more processors via at least one of the one or more memories, are further operable to:

store said media stream in any manner based upon the determined interest level.

17. The computer system of claim 12, wherein said media stream manipulation presents output of media stream upon a media presentation device, wherein the biometric data is acquired at a time the output of the media stream is being presented and is time-synched with a presentation of the media stream, wherein the program instructions, stored on at least one of the one or more storage devices for execution by at least one of the one or more processors via at least one of the one or more memories, are further operable to:

store said media stream in any manner based upon the determined interest level.

18. The computer system of claim 12, wherein said media stream comprises at least one of audio stream, a video stream, and a stream comprising a plurality of images, wherein the program instructions, stored on at least one of the one or more storage devices for execution by at least one of the one or more processors via at least one of the one or more memories, are further operable to:

use the biometric data-to determine an emotional interest level of a provider of the biometric data, wherein different ones of the portions of the media stream is associated with different determined emotional interest levels; and store said media stream in any manner based upon the determined emotion interest levels.

* * * * *